United States Patent [19]

Dennany, Jr.

[11] Patent Number: 5,425,558
[45] Date of Patent: Jun. 20, 1995

[54] QUICK-CONNECT COUPLING

[75] Inventor: Robert D. Dennany, Jr., Lapeer, Mich.

[73] Assignee: Handy & Harman Automotive Group, Inc., Auburn Hills, Mich.

[21] Appl. No.: 108,096

[22] Filed: Aug. 17, 1993

[51] Int. Cl.⁶ ............................................ F16L 37/10
[52] U.S. Cl. .................................. 285/308; 285/314; 285/318
[58] Field of Search ............... 285/308, 313, 314, 318, 285/39

[56] References Cited

U.S. PATENT DOCUMENTS

| 114,903 | 5/1871 | Anderson . | |
|---|---|---|---|
| 996,023 | 6/1911 | McAdoo . | |
| 1,587,079 | 6/1926 | Machino . | |
| 2,001,244 | 5/1935 | Ezell | 285/314 |
| 2,267,252 | 12/1941 | Pitsch . | |
| 2,343,755 | 3/1944 | Dougherty . | |
| 2,693,378 | 11/1954 | Beyer . | |
| 3,083,042 | 3/1963 | Collar | 285/314 |
| 3,351,359 | 11/1967 | Ferraris | 285/314 |
| 3,479,068 | 11/1969 | Brittain . | |
| 3,540,760 | 11/1970 | Miller et al. . | |
| 3,635,501 | 1/1972 | Thorne-Thomsen | 285/314 |
| 3,709,526 | 1/1973 | Cromie . | |
| 4,055,359 | 10/1977 | McWethy . | |
| 4,063,760 | 12/1977 | Moreiras . | |
| 4,296,689 | 10/1981 | Hardesty | 285/314 |
| 4,376,525 | 3/1983 | Fremy . | |
| 4,401,326 | 8/1983 | Blair . | |
| 4,412,694 | 11/1983 | Rosenberg | 285/314 |
| 4,565,392 | 1/1986 | Vyse . | |
| 4,750,762 | 6/1988 | Corzine . | |
| 4,906,031 | 3/1990 | Vyse . | |
| 4,915,421 | 4/1990 | Dennany, Jr. | 285/39 |
| 5,028,080 | 7/1991 | Dennany, Jr. | 285/308 |
| 5,120,085 | 6/1992 | Shin . | |

FOREIGN PATENT DOCUMENTS

| 2442393 | 7/1980 | France | 285/314 |
|---|---|---|---|
| 1007203 | 10/1965 | United Kingdom | 285/314 |
| 9008288 | 7/1990 | WIPO | 285/314 |

Primary Examiner—Eric K. Nicholson
Attorney, Agent, or Firm—Pennie & Edmonds

[57] ABSTRACT

A coupling for holding two tubes together and including a housing member connected to the end of one of the tubes and a locking collar rotatably mounted in said housing for rotation between a first rotative position in clamping engagement with an end of a second tube inserted into the housing and into fluid communication with the first tube and a second rotative position permitting insertion of the end of the second tube into the housing.

12 Claims, 5 Drawing Sheets

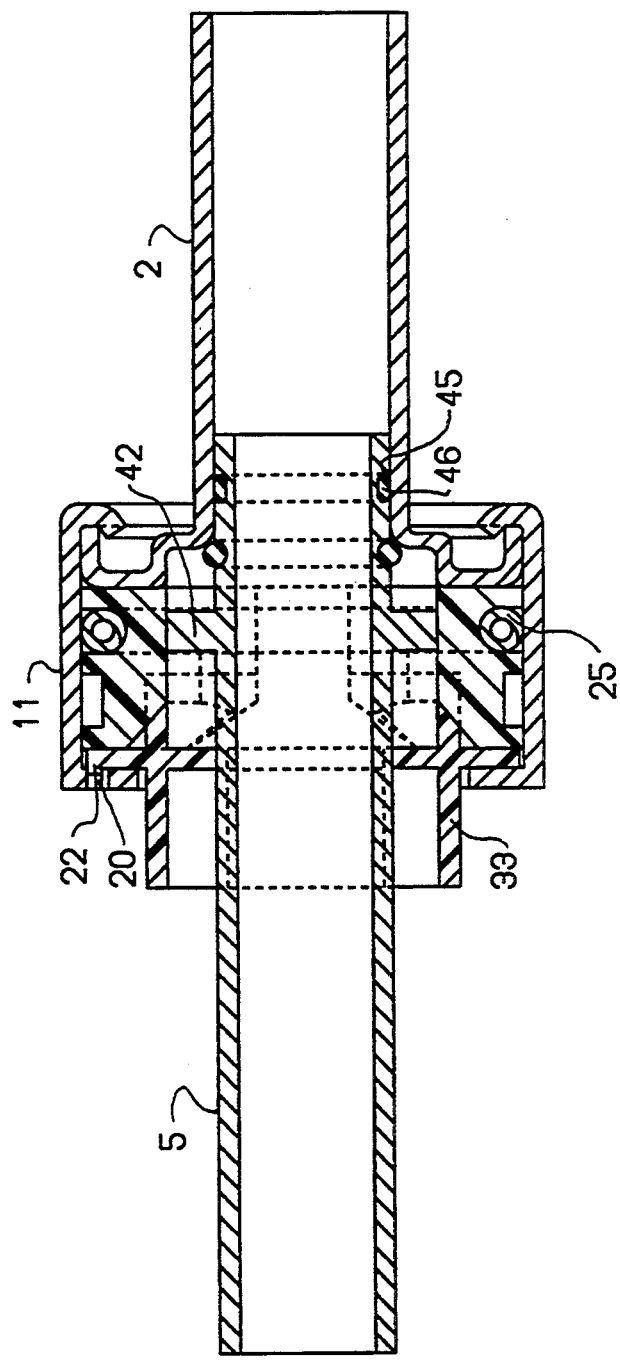

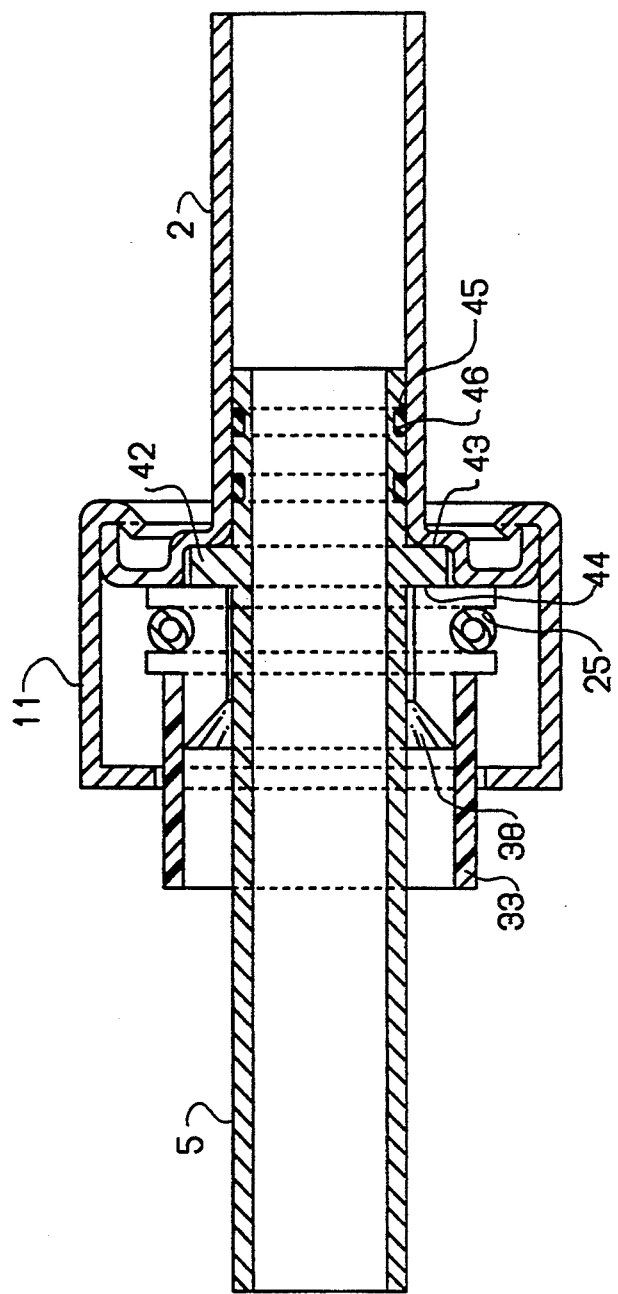

1

QUICK-CONNECT COUPLING

FIELD OF THE INVENTION

The invention relates to a quick-connect coupling for facilitating the quick fluid-tight connection of the end sections of two tubular members.

BACKGROUND OF THE INVENTION

In many industries and, in particular, in the automotive industry, there is a need for connecting together various engine parts and equipment contained in the engine compartment of the vehicle. For example, plumbing lines are necessary between various parts of the air conditioning system, such as the condenser, compressor and evaporator. These plumbing lines are typically provided by flexible tubing; and it is desirable to be able to make the connection without extensive use of equipment or manipulation and/or adaption of the tube parts. It is also desirable to have the connection of the tubes made in such a way that they can be disconnected for repair or replacement of the associated equipment or the tubes themselves.

Besides the need for making a connection which is initially fluid-tight, consideration must be given to constructing the coupling so that the tube connection remains fluid-tight over extended use of the vehicle. With quick-connect couplings, this has generally been found to be difficult to attain. The very purpose of the quick-connect coupling is to permit an easy and quick connection and disconnection of the tube parts without the need for attachment of auxiliary clamping structure or tools. This is generally at odds with the need for assuring that the connection remains fluid-tight over extended use.

With automotive equipment, tube couplings or connections are continuously subjected to vibration and flexing during use of the vehicle. A typical prior art quick-connect coupling is disclosed in U.S. Pat. No. 4,055,359. Couplings of this type are presently in wide use in the automotive industry. It has been found, however, that even with a proper initial coupling of the tube parts, this type of structure does have a tendency, over time, to become disconnected due to vibration and flexing, particularly when the system is pressurized. Part of the reason for this malfunctioning is believed to be caused due to the manner in which the initial connection of the coupling is made. As disclosed in the '359 patent, the connection is effected by a simple axial movement of the tube ends together. This movement causes a spring member of the coupling to expand and position itself tightly around the coupled ends of the tubes. The spring member is, however, not restrained against expanding once the tube parts are coupled together. It is therefore free to move to an uncoupling position whenever the forces acting on the coupling, such as vibration and flexing, act on the spring in an uncoupling direction.

SUMMARY OF THE PRESENT INVENTION

With the present invention, the coupling has been constructed to permit easy axial movement of the tube ends together to effect their connection in a fluid-tight manner. During this movement, parts of the coupling member expand outwardly to permit passage of one of the tube ends as it is connected to the other tube end. With the coupling of the present invention, the expandable parts are rotated, after the tube connection has been made, to a position where they can no longer expand outwardly. Thus, vibration and flexing cannot cause subsequent disconnection of the tube ends from the coupling structure. A fluid-tight connection between the tube ends will thereby be maintained during extended use.

BRIEF DESCRIPTION OF THE DRAWINGS

FIG. 8 is a cross-sectional view of the assembled coupling with the tube ends partially connected; and FIG. 9 is a cross-sectional view of the assembled coupling with the tube ends fully connected.

DETAILED DESCRIPTION OF THE INVENTION

Figure 1:
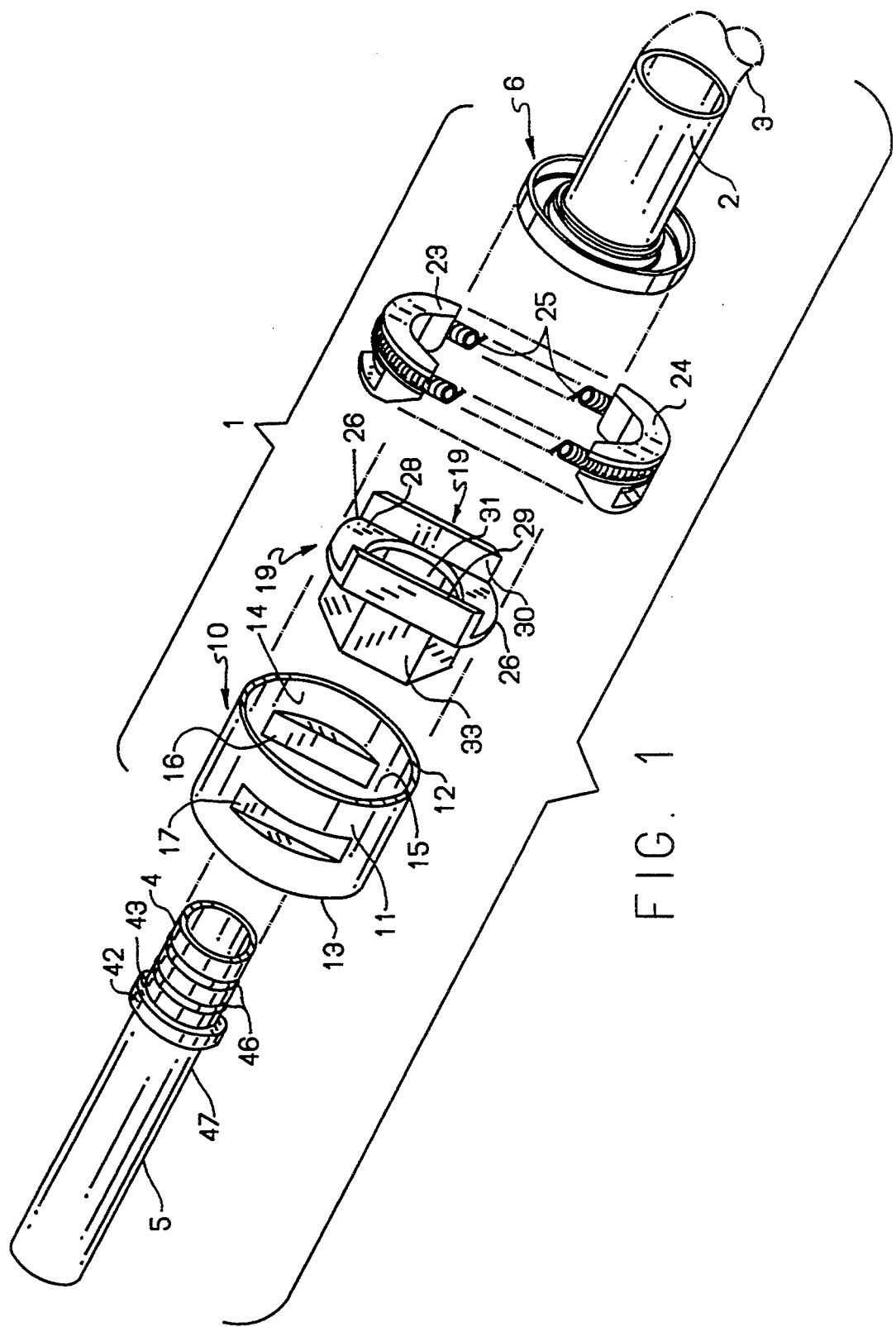
FIG. 1 is an exploded view of the connector of the present invention.
Figure 2:
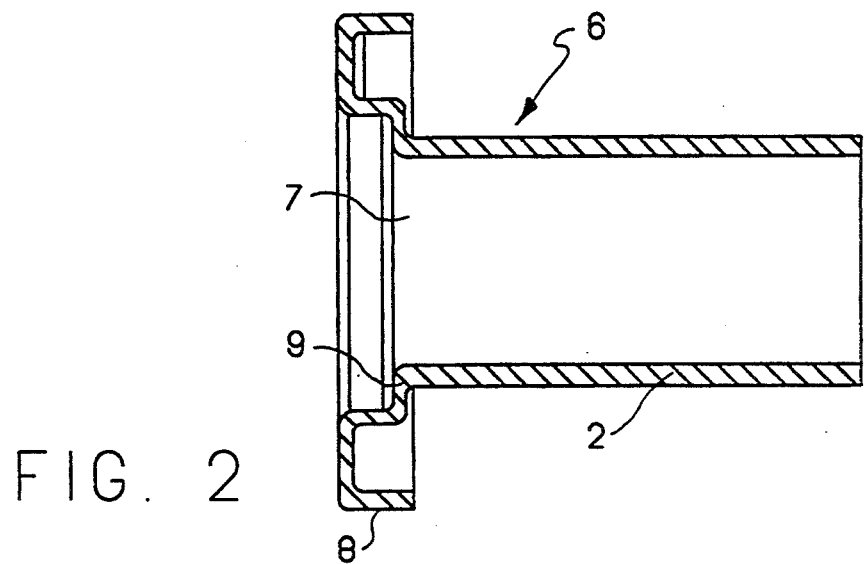
FIG. 2 is a cross-sectional view of one of the body members of the coupling.

The coupling, generally designated by reference number 1, is constructed for connecting and holding the tube end 2 of a first tube 3 to the end 4 of a second tube 5 in a fluid-tight, vibration resistant manner. The tubes and/or tube ends can be of flexible material or rigid in construction. In an air conditioning unit in a vehicle, for example, the first tube 3 may be of metal construction and permanently attached to the inlet or outlet of the particular part of the air conditioning unit with which it is associated. Also, in such a situation, the end 2 of this first tube 3 can be integrally formed with a first body member 6 as a tubular section thereof.

The first body member 6 includes a first body opening 7 aligned axially with and extending through the tubular section. The body member 6 includes a channel shaped flange 8 extending radially outwardly of the body opening 7. Immediately surrounding the body opening 7, the flange 8 forms a recessed annular seat 9. This channel shape adds rigidity to the first body member and provides a means for connecting it to a second body member 10 of the coupling.

The second body member 10 includes a cylindrical housing section 11 having a first end 12 and second end 13 with an internal wall surface 14 extending between the ends. The housing section defines an axially extending body opening 15 which, as shown in FIGS. 8 and 9, is axially aligned with the body opening 7 of the first body member 6. As also in FIGS. 8 and 9, the first and second body members are connected together at the end 12 of the first body member by crimping this end over the periphery of the U-shaped flange 8 of the first body member.

Figure 3:
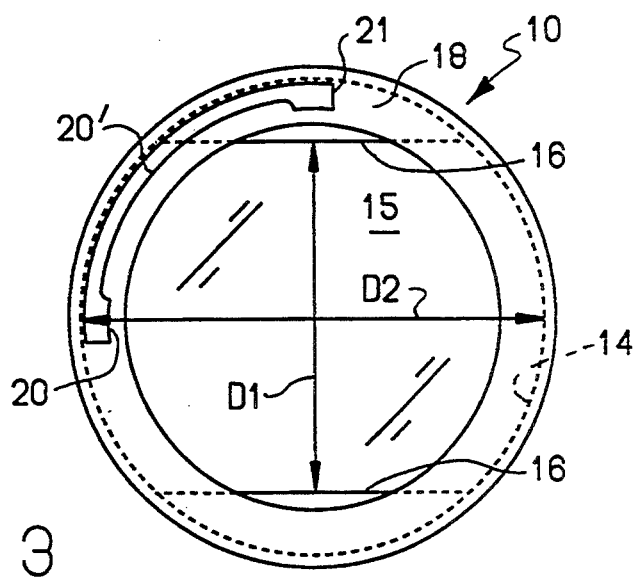
FIG. 3 is an end view of a second body member of the coupling.

As shown in FIG. 3, the second body member 10 has a first lateral dimension D-1 which is less than a second lateral dimension D-2. These dimensions extend perpendicular to each other. The first lateral dimension is measured between diametrical opposite having lateral sides of the internal wall surface 14 of the housing section in an area where these sides define chordal wall sections 16. The chordal wall sections 16 face each other and are formed by indentations 17 in the outer side wall of the housing section 11 at a location generally midway between the ends 12 and 13 of the housing section.

The second end 13 of the housing section includes a radially inwardly extending flange 18 for rotatively supporting a collar carriage 19 disposed within the second body member, as more fully described below. The flange also includes first and second stop means 20, 21. These stop means are defined by enlarged apertures spaced circumferentially from each other by 90° and connected together by a slot 20'. They function with a third stop means 22 on the collar carriage, as also more fully described below.

The collar carriage 19 is part of the locking collar means of the coupling. The locking collar means also includes two C-shaped collar parts 23, 24 and an annular resilient spring means 25.

The collar carriage 19 is adapted to be rotatably mounted within the second body member 10 for movement between two separate rotative positions. For this purpose, the carriage includes diametrically opposite flanges 26. Each flange includes opposite slide surfaces 27, 28. The slide surfaces 27 slideably seats on the inside of the flange 18 of the second body member. This carriage also includes side walls 29 extending upwardly from the flanges 26. These side walls are themselves disposed diametrically opposite each other and have flat facing surfaces 30. A carriage opening 31 extends axially through the carriage.

The carriage is adapted to be assembled into the second body member by insertion through the open end 12 of the body member, with the side walls 29 fitting between the chordal wall sections 16. In the assembled position of the carriage, it is located within the body opening 15 of the second body member 10 on the axial side of the chordal wall sections adjacent the end 13 of the housing section 11. As shown in FIGS. 8 and 9, the height of the side walls 29 is less than the spacing between the chordal sections 16 and the flange 18 so as to permit rotation of the carriage once it is axially located within the housing section 11.

On one of the flanges 26 of the collar carriage a detent is formed to define the third stop means 22 for cooperating with the first and second stop means 20, 21 on the flange 18 of the housing section. The detent is sized to provide a slight interference fit with the slot by frictional engagement with the side edges of the slot. The detent is held at the stop means 20 or 21 by this slight interference to releasably hold the carriage in one or the other of its rotative positions, as more fully described below.

In the assembled position of the carriage 19 within the body opening 15 of the housing section 11, a control end 33 of the carriage extends axially through the second end 13 of the housing section 11. The control end is hexagonal in shape to facilitate use of a wrench or similar tool, if necessary, for rotating the carriage 19 between its two rotative positions.

Figure 4:
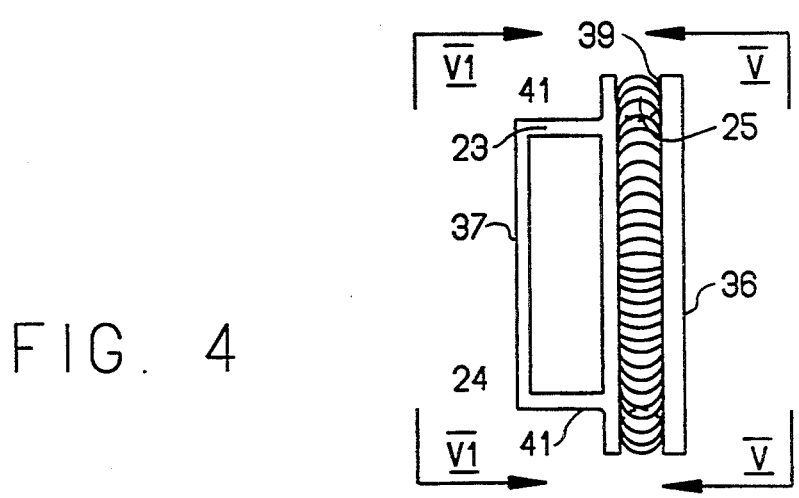
FIG. 4 is a side view of the locking collar parts of the coupling.
Figure 5:
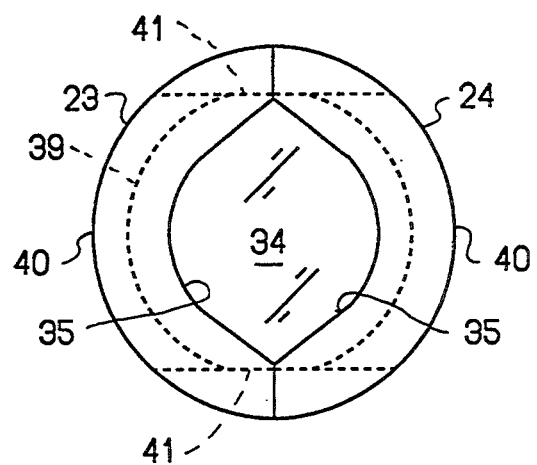
FIG. 5 is an end view taken along lines V—V of FIG. 4.
Figure 6:
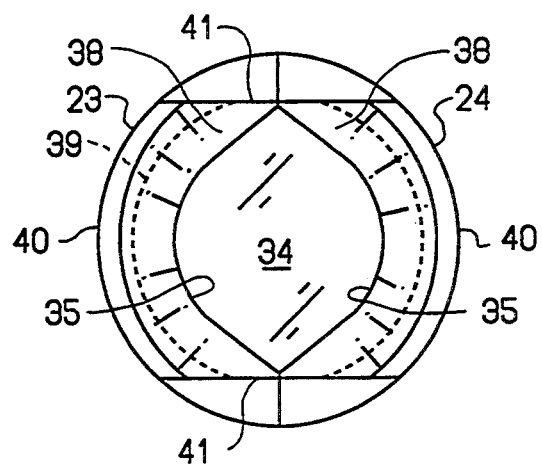
FIG. 6 is an end view taken along lines VI—VI of FIG. 4.
Figure 7:
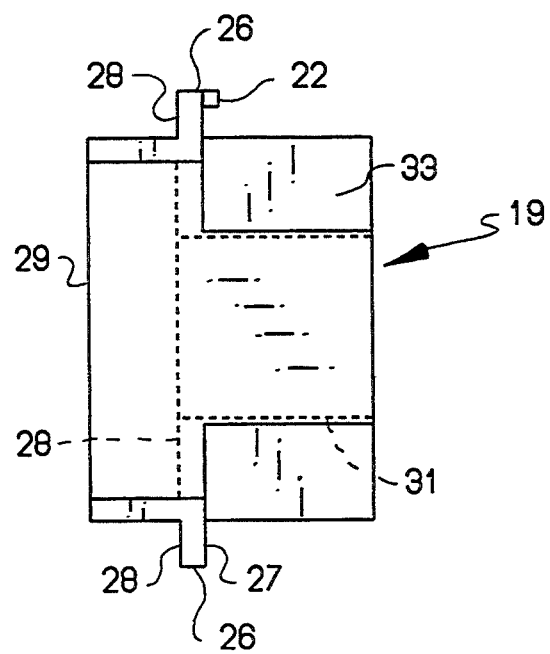
FIG. 7 is a side view of the collar carriage of the coupling.

The final parts of the coupling includes the two C-shaped collar parts 23, 24 and the annular spring 25. As shown in FIGS. 4, 5 and 6 the two C-shaped collar parts 23, 24 are disposed in facing relation to each other to define a collar opening 34 therebetween. The collar opening is defined by inner holding surfaces 35 extending between axially oppositely facing first and second collar ends 36, 37. The first ends 36 are flat while the second ends 37 include chamfered surfaces 38 defining an entry to the collar opening 34.

Adjacent the axial ends 36, the C-shaped collar parts have an outer circular configuration with a U-shaped groove 39 extending therearound. The resilient spring 25 fits within this groove and holds the C-shaped collar parts together in a normal closed position. The resilient nature of the spring permits relative sliding of the collar parts away from each other. The outer surfaces of the C-shaped collar parts, as measured in the direction of sliding, define opposite outer locking surface 40.

Adjacent the axial ends 37 of the C-shaped collar parts, the outer periphery is cut away on diametrically opposite sides to form flat surfaces 41. With the two C-shaped collar parts 23, 24 assembled and held together by the spring 25, they are non-rotatably mounted on the slide surfaces 28 of the flange 26. This mounting permits sliding movement of the C-shaped collar parts toward and away from each other. During this sliding movement, the flat side surfaces 41 of the collar parts also slideably engage against the inner surfaces 30 of the side walls 29 of the collar carriage 19. These side walls preclude rotation of the collar parts relative to the carriage. However, as stated above, the carriage itself is rotatably mounted within the body opening of the second body member 10. Thus, the collar parts are mounted within this body opening for both sliding movement toward and away from each other and for rotation with respect to the body member.

As shown in FIGS. 8 and 9, the ends 36 and the adjacent circular periphery of the collar parts, including the opposite outer locking surfaces 40, extend above the side walls 29 of the collar carriage and are in axial alignment with the chordal wall sections 16 of the housing section 11. After these parts have been positioned in this manner, the first body member 6 is inserted into the open end 12 of the second body member 10 and the end 12 is crimped around the U-shaped channel flange 8 of the first body member to secure all the parts together.

FIG. 9 shows how the coupling functions during insertion of the end 4 of the second tube 5 into the end 2 of the first tube 3. The second tube 5 is of conventional construction and includes a radially outwardly extending circumferential bead 42 located adjacent the terminal end of the tube. The bead has opposite axially facing surfaces 43, 44. Disposed between the bead 39 and terminal end of the tube, the tube end 4 is formed with two grooves 45 in which are secured suitable O-rings 46. This end 4 of the tube 5 is adapted to be fully received within the end 2 of the first tube 3 to provide a sealing connection between the two tubes. The O-rings 46 compress upon this insertion of the one tube into the other to effect the sealing connection.

To assemble the two tubes together in the manner described above and with the first tube 3 already connected to the coupling by means of the first body member 6, the end 4 of the second tube 5 is inserted into the end of the first tube by way of the coupling. This is effected by inserting the end 4 into the carriage opening 31 at the control end 33 of the carriage. During this movement, the C-shaped collar parts 23, 24 and the collar carriage 19 are positioned within the housing section 11 in the rotative position shown in FIG. 8. In this position, the carriage side walls 29 are aligned between the chordal wall sections 16 and the collar parts are positioned for sliding movement away from each other along the longer lateral dimension D-2 of the housing section 10. As shown in FIG. 8, this sliding movement is required to permit the end 4 of the tube 5, and in particular the bead 42, to pass into the collar opening 34. Entry of the bead into the collar opening is facilitated by the chamfered surfaces 38. As these surfaces are engaged by the end 4 and bead 42, the C-shaped collar parts 23, 24 slide, against the resilience of the spring 25, away from each other to the position shown in FIG. 8.

Once the bead 42 and the end 4 has passed completely through the collar parts, the spring returns these parts to their closed position. At this point, the end 4 of the tube, with the O-rings 46, has been inserted into the end 2 of the first tube. Also, as this connection is completed, the bead 42 seats itself on the annular seat 9 of the first body member with the side 43 of the bead engaging of the seat 9. At the same time, the other side 44 of bead engages against the flat axial ends 36 of the collar parts. This prevents tilting of the second tube relative to the first tube and thus maintains these tubes in axial alignment even when subjected to forces of vibration and flexing.

During the above assembly, the parts of the coupling are held in the proper rotative position by engagement of the detent 22 within the opening 20 of the flange 18 of the housing section 11. Next, in order to lock the collar parts 23, 24 against any sliding movement relative to each other and thus prevent disconnection of the second tube from the first tube, the collar carriage 19 is rotated from the position shown in FIG. 8 to the position shown in FIG. 9. The amount of rotation with the embodiment shown the drawings is 90°. This moves the carriage to a position in which the detent 22 overlies the enlarged aperture 21 in the flange 18. The detent 22 is held in the aperture 21 by the slight interference which would be encountered at the entrance to the slot 20'. In this position the detent 22 releasably holds the carriage against rotation.

As shown in FIG. 9 the opposite outer locking surfaces 40 of the collar parts, as measured in the direction of sliding movement of these parts, are spaced from each other by a distance equal to the first lateral dimension D-1, as measured between the opposite surfaces of the chordal sections 16. Thus, when in the position shown in FIG. 9, these opposite locking surfaces 40 of the collar parts engage against the chordal wall sections 16 and are prevented from opening. In this position, the inner holding surfaces 35 of the collar parts engage against a clamping section 47 on the tube 5 which is spaced from the end 4 of the tube and immediately adjacent the bead 42. This holds the second tube from axial disconnection from the first tube, and the bead further assures that no disconnection can occur.

When it is necessary to disconnect the tubes for repair or replacement of equipment to which the tubes are connected or for repair or replacement of the tubes themselves, the collar carriage 19 is rotated back to the position shown in FIG. 8. Once in this position a suitable tool can be inserted into the coupling to move the C-shaped collar parts 23, 24 apart. The tube 5 can then be withdrawn from the coupling.

What is claimed is:

1. In a coupling for holding the end of a first tube connected to an end of a second tube, the improvement comprising:

a) a first body member for connecting to said end of the first tube, said first body member having a first body opening extending therethrough;

b) a second body member having a housing section with a first end and a second end and an internal wall surface extending between said ends and defining an axially extending second body opening therethrough, said second body opening having a first lateral dimension which is less than a second lateral dimension extending at an angle to said first lateral dimension, said second body member being fixed to said first body member with said second body opening axially aligned with said first body opening;

c) locking collar means rotatably secured within said second body opening for holding said second tube against axial disconnection from said first tube when the end of the second tube is connected to the end of the first tube, said locking collar means including;

i) two C-shaped collar parts having inner surfaces and outer surfaces, said collar parts disposed in facing relation to each other and assembled for sliding movement toward and away from each other between a closed position and an open position, said outer surfaces having opposite outer locking surfaces, as measured in the direction of said sliding movement, which are spaced from each other by a distance equal to said first lateral dimension when said parts are in said closed position, said inner surfaces including inner holding surfaces defining a collar opening for receiving a clamping section of the second tube when the end thereof has been connected to the end of the first tube and for holding the second tube by said clamping section against axial disconnection from said first tube when located in a first rotative position within said second body opening with said opposite outer locking surfaces of the collar parts engaging against diametrical opposite sides of the internal wall surface of said housing section, as measured along said first lateral dimension of said second body opening; and ii) resilient means configured and positioned to surround said outer surfaces of said collar parts in contact relation for resiliently holding said collar parts together in said facing relation and permitting relative sliding of the collar parts away from each other when located in a second rotative position within said second body opening with said collar parts aligned therein for sliding movement along said second lateral dimension so as to permit passage of the end of said second tube therethrough as the ends of said tubes are being connected together.

2. In a coupling for connecting an end of a first tube to an end of a second tube by inserting the end of the second tube into the end of the first tube, the improvement comprising:

a) a first body member having a first body opening with an axial tubular section defining the end of the first tube;

b) a second body member having a housing section with a first end and a second end and an internal wall surface extending between said ends and defining an axially extending second body opening therethrough, said second body opening having a first lateral dimension which is less than a second lateral dimension extending perpendicular to said first lateral dimension, said second body member being fixed at the first end thereof to said first body member with said second body opening axially aligned with said first body opening and said tubular section;

c) locking collar means rotatably secured within said second body opening for holding said second tube against axial disconnection from said first tube when the end of the second tube is inserted into the end of the first tube, said locking collar means including;

i) two C-shaped collar parts having inner surfaces and outer surfaces, said collar parts disposed in facing relation to each other and assembled for sliding movement toward and away from each other between a closed position and an open position, said outer surfaces having opposite outer locking surfaces, as measured in the direction of said sliding movement, which are spaced from each other by a distance equal to said first lateral dimension when said parts are in said closed position, said inner surfaces having inner holding surfaces defining a collar opening therebetween for receiving a clamping section of the second tube when said end has been inserted into the end of the first tube and for holding the second tube by said clamping section against axial disconnection from said first tube when located in a first rotative position within said second body opening with said opposite outer locking surfaces of the collar parts engaging against diametrical opposite sides of the internal wall surface of said housing section, as measured along said first lateral dimension of said opening; and ii) resilient means configured and positioned to surround said outer surfaces of said collar parts in contact relation for resiliently holding said collar parts together in said facing relation and permitting relative sliding of the collar parts away from each other when located in a second rotative position within said second body opening with said collar parts aligned therein for sliding movement along said second lateral dimension so as to permit passage of the end of said second tube therethrough as said tubes are being connected together, 3. In a coupling for holding the end of a first tube connected to an end of a second tube, the improvement comprising:

a) a first body member for connecting to said end of the first tube, said first body member having a first body opening extending therethrough;

b) a second body member having a housing section with a first end and a second end and an internal wall surface extending between said ends and defining an axially extending second body opening therethrough, said second body opening having a first lateral dimension which is less than a second lateral dimension extending at an angle to said first lateral dimension, said second body member being fixed to said first body member with said second body opening axially aligned with said first body opening;

c) locking collar means rotatably secured within said second body opening for holding said second tube against axial disconnection from said first tube when the end of the second tube is connected to the end of the first tube, said locking collar means including;

i) two C-shaped collar parts disposed in facing relation to each other and assembled for sliding movement toward and away from each other between a closed position and an open position, said collar parts having opposite outer locking surfaces, as measured in the direction of said sliding movement, which are spaced from each other by a distance equal to said first lateral dimension when said parts are in said closed position, said collar parts further including inner holding surfaces defining a collar opening for receiving a clamping section of the second tube when the end thereof has been connected to the end of the first tube and for holding the second tube by said clamping section against axial disconnection from said first tube when located in a first rotative position within said second body opening with said opposite outer locking surfaces of the collar parts engaging against diametrical opposite sides of the internal wall surface of said housing section, as measured along said first lateral dimension of said second body opening;

ii) resilient means for resiliently holding said collar parts together in said facing relation and permitting relative sliding of the collar parts away from each other when located in a second rotative position within said second body opening with said collar parts aligned therein for sliding movement along said second lateral dimension so as to permit passage of the end of said second tube therethrough as the ends of said tubes are being connected together; and iii) a collar carriage having a slide surface on which said collar parts are non-rotatably mounted for said sliding movement toward and away from each other, said carriage being rotatably mounted within the second body member for rotating said collar parts between said first and second rotative positions.

4. In a coupling for a first tube and a second tube according to claim 3, the improvement wherein:

a) the first body member further includes a radially outwardly extending circumferential flange at an end of the tubular section thereof; and b) said second body member is fixed at its one end to said flange of the first body member.

5. In a coupling for a first tube and a second tube according to claim 4, the improvement wherein:

a) said diametrically opposite sides of the internal wall surface of the housing section of said second body member are defined by chordal wall sections having opposite, facing lateral sides, said chordal wall sections being disposed at a spaced axial location relative to the first and second ends of the second body member;

b) said second body member is fixed to said first body member on one axial side of said chordal wall sections; and c) said carriage is rotatably mounted within said second body opening on the other axial side of said chordal wall sections.

6. In a coupling for a first tube and a second tube according to claim 5, the improvement wherein:

a) said carriage includes side walls on opposite sides of said slide surface and extending upwardly therefrom;

b) said collar parts include opposite outer side surfaces, as measured in a direction at right angles to said sliding movement, said side surfaces being flat and slideably engaging along the side walls of said carriage.

7. In a coupling for a first tube and a second tube according to claim 5, the improvement wherein:
   a) said second body member has a radially inwardly extending flange at the second end thereof on which said carriage is rotatably supported; and
   b) said carriage includes a control end extending axially through the second end of said second body member for manipulation thereof to effect rotation of said carriage.

8. In a coupling for a first tube and a second tube according to claim 5, the improvement wherein:
   a) said collar parts include axially oppositely facing first and second ends with the first ends facing the first end of said second body member and the second ends facing the second end of the second body member and having chamfered surfaces defining an entry to said collar opening to facilitate sliding movement of the second tube through said collar opening as said second tube is inserted into said first tube.

9. In a coupling for a first tube and a second tube according to claim 8 where the second tube includes a radially outwardly extending circumferential bead adjacent the end thereof, with said bead having opposite axially facing surfaces, the improvement wherein:
   a) the radially outwardly extending circumferential flange of the first body member includes a recessed annular seat therein for receiving the bead of the second tube in seated relation therewith with one axial side of said bead engaging against said seat when the end of the second tube has been inserted into the end of the first tube; and
   b) said collar parts are positioned within said second body opening for engagement of their first ends against the other axial side of said bead for holding said second tube against axial disconnection from said first tube and for further holding the end of the second tube in axial alignment with the end of the first tube.

10. In a coupling for a first tube and a second tube according to claim 9, the improvement wherein:
    a) the flange of the second body member includes first and second stop means circumferentially spaced from each other by 90°, with the location of the first stop means corresponding to the first rotative position of said collar parts and the location of the second stop means corresponding to the second rotative position of said collar parts; and
    b) said carriage includes a third stop means overlying said flange for engagement with said first and second stop means to releasably hold said collar parts in said first and second rotative positions.

11. In a coupling for a first tube and a second tube according to claim 10, the improvement wherein:
    a) the first and second stop means are defined by first and second apertures connected together by a slot; and
    b) said third stop means is defined by a detent frictionally engageable within said slot and apertures.

12. In a coupling for connecting an end of a first tube to an end of a second tube inserting the end of the second tube into the end of the first tube, the improvement comprising;
    a) a first body member having a first body opening with an axial tubular section defining the end of the first tube;
    b) a second body member having a housing section with a first end and a second end and an internal wall surface extending between said ends and defining an axially extending second body opening therethrough, said second body opening having a first lateral dimension which is less than a second lateral dimension extending perpendicular to said first lateral dimension, said second body member being fixed at the first end thereof to said first body member with said second body opening axially aligned with said first body opening and said tubular section;
    c) locking collar means rotatably secured within said second body opening for holding said second tube against axial disconnection from said first tube when the end of the second tube is inserted into the end of the first tube, said locking collar means including;
       i) two C-shaped collar parts disposed in facing relation to each other and assembled for sliding movement toward and away from each other between a closed position and an open position, said collar parts having opposite outer locking surfaces, as measured in the direction of said sliding movement, which are spaced from each other by a distance equal to said first lateral dimension when said parts are in said closed position, said collar parts further having inner holding surfaces defining a collar opening therebetween for receiving a clamping section of the second tube when said end has been inserted into the end of the first tube and for holding the second tube by said clamping section against axial disconnection from said first tube when located in a first rotative position within said second body opening with said opposite outer locking surfaces of the collar parts engaging against diametrical opposite sides of the internal wall surface of said housing section, as measured along said first lateral dimension of said opening;
       ii) resilient means for resiliently holding said collar parts together in said facing relation and permitting relative sliding of the collar parts away from eaach other when located in a second rotative position within said second body opening with said collar parts aligned therein for sliding movement along said second lateral dimension so as to permit passage of the end of said second tube therethrough as said tubes are being connected together; and
       iii) a collar carriage having a slide surface on which said collar parts non-rotatably mounted for said sliding movement toward and away from each other, said carriage being rotatably mounted within the second body member for rotating said collar parts between said first and second rotative positions.

* * * * *